United States Patent [19]

Nebot Aparici

[11] Patent Number: 5,893,268
[45] Date of Patent: Apr. 13, 1999

[54] FUSION HEAT RECOVERY AND COMBUSTION GASES FILTERING SYSTEM WITH ELECTRIC POWER PRODUCTION

[75] Inventor: D. Antonio Nebot Aparici, Villafames, Spain

[73] Assignee: Colorobbia Espana, S.A., Villafames, Spain

[21] Appl. No.: 08/991,037

[22] Filed: Dec. 16, 1997

[30] Foreign Application Priority Data

Dec. 16, 1996 [ES] Spain .................................. 9602652

[51] Int. Cl.$^6$ .................................................. F01K 13/00
[52] U.S. Cl. ............................ 60/676; 110/216; 432/72
[58] Field of Search ........................ 60/655, 671, 676; 110/216; 432/72; 65/134.6

[56] References Cited

U.S. PATENT DOCUMENTS 5,640,842   6/1997  Bronizki ................................ 60/655
5,746,141   5/1998  Lacquaniti et al. ................... 110/216

*Primary Examiner*—Noah P. Kamen
*Attorney, Agent, or Firm*—Helfgott & Karas, P.C.

[57] ABSTRACT

The system comprises providing every oven (1) used in a ceramic enamelling plant with an operative unit (3) that works with an exchanger (4) and a filter (5) that allows most of the waste products entrained by the fumes to be recovered, sent back to the oven (1) and hence be recycled. The operative units (3) of the various ovens (1), in accordance with the improvements, are in direct communication and in open circuit with an output exchanger (9) associated with a turbogenerator (10), using air as the heat transmission fluid. The turbogenerator (10) includes a secondary circuit (11) of the exchanger (9), using a vapor fluid to drive a turbine (12) that in turn drives an alternator (13) for generating electric power.

2 Claims, 2 Drawing Sheets

FUSION HEAT RECOVERY AND COMBUSTION GASES FILTERING SYSTEM WITH ELECTRIC POWER PRODUCTION

OBJECT OF THE INVENTION

The present invention relates to a number of improvements made to a heat recovery and gases filtering system at the outputs from industrial fusion ovens, which system allows both high yields to be obtained in the production of electric power and fumes to be perfectly scrubbed, the waste products obtained being moreover recyclable.

The present invention is especially applicable to the glass-ceramics and chemical industry but applies equally in any other field requiring a similar level of performance.

This system uses a fluid, preferably water, which equally includes an organic fluid, as a heat exchanging product, flowing in a second circuit to drive a turbine and, through the latter, an appropriate alternator generating electric power.

The improvements of the invention are based upon the use of air as the heat transmission fluid, and vapour as the fluid in the second circuit for driving the generator.

BACKGROUND OF THE INVENTION

A heat recovery and combustion gas filtering system is described in a related patent of invention U.S. Pat. No. 9,302,364. The system described is especially applicable to ceramic enamelling plants which are devised to resolve the loss of waste products entrained by exhaust gases, on one hand, the system enables waste products obtained from filtering recycled, and, on the other, energy is be made the most of.

To that end, the system of the related patent of invention provides an operative filtering unit for each of the ovens used in the plant. The ovens working with the respective heat exchanger allows such filtering to be carried out under the best possible. An operative unit is located over the oven exhaust passage in order for hot water to be obtained using the exchanger, at a temperature ranging between 90 and 150° C. Further cold fumes that allow flexible bag or cap filters to be used, from which waste products are obtained that are recyclable back to a specific and unitary oven.

The various heat exchangers working with the respective ovens are interconnected in parallel and associated with a joint circuit provided with a second heat exchanger. The circuit is preferably a water circuit and is related to a second circuit. Through the second circuit an organic fluid flows, in order to drive a turbine and, through the same, a respective alternator generating electric power, i.e. constituting an organic cycle turbogenerator.

In short, in the system subject of the related patent of invention, a filter is provided at the output of each oven for fumes that have passed through a heat exchanger. A special feature is that the heat exchanger is associated with a heat exchanging circuit that includes a fluid preferably water. The water circuit is the meeting point for all the operative units of the various ovens. Each unit including the respective filter and the heat exchanger, and a manifold and an aspirator expediting the flow of gases.

The water circuit is associated with a second output exchanger that transmits heat to a turbogenerator, which is provided by water heated in the input exchange to a temperature ranging between 90 and 150° C. The turbogenerator includes a circuit that has an organic fluid for driving a turbine with which an alternator is associated for the generation of an output electric current.

SUMMARY OF THE INVENTION

The improvements of the invention are specifically applicable to the system described in the previous section, which is the system in main patent of invention U.S. Pat. No. 9,302,634. The first improvement is based on the use of air instead of water as the heat transmission fluid. The use of air as the heat transmission fluid is much cheaper and allows closed cooling circuits to be eliminated, which means that open circuits may be used.

Furthermore, the use of air as the heat transmission fluid is not only less expensive than water, oil or other liquid fluids, but also allows no waste products whatsoever to be created.

It is also noteworthy that the use of air as the heat transmission fluid allows the circuit at which the various exchangers of the units associated with each of the ovens meet to be eliminated. Thus, avoiding a closed circuit return from the output exchanger to the input exchanger, for where, the discharge occurs directly to the atmosphere.

Another of the improvements lies in that the circuit in which the respective turbogenerator is integrated makes use of a vapour fluid in lieu of an organic fluid.

DESCRIPTION OF THE DRAWINGS

In order to provide a fuller description and contribute to a complete understanding of the characteristics of the invention, in accordance with a preferred practical embodiment thereof, a sheet of drawings is attached as an integral part of the description which, while purely illustrative and not fully comprehensive, shows the following.

PREFERRED EMBODIMENT OF THE INVENTION

Figure 1:
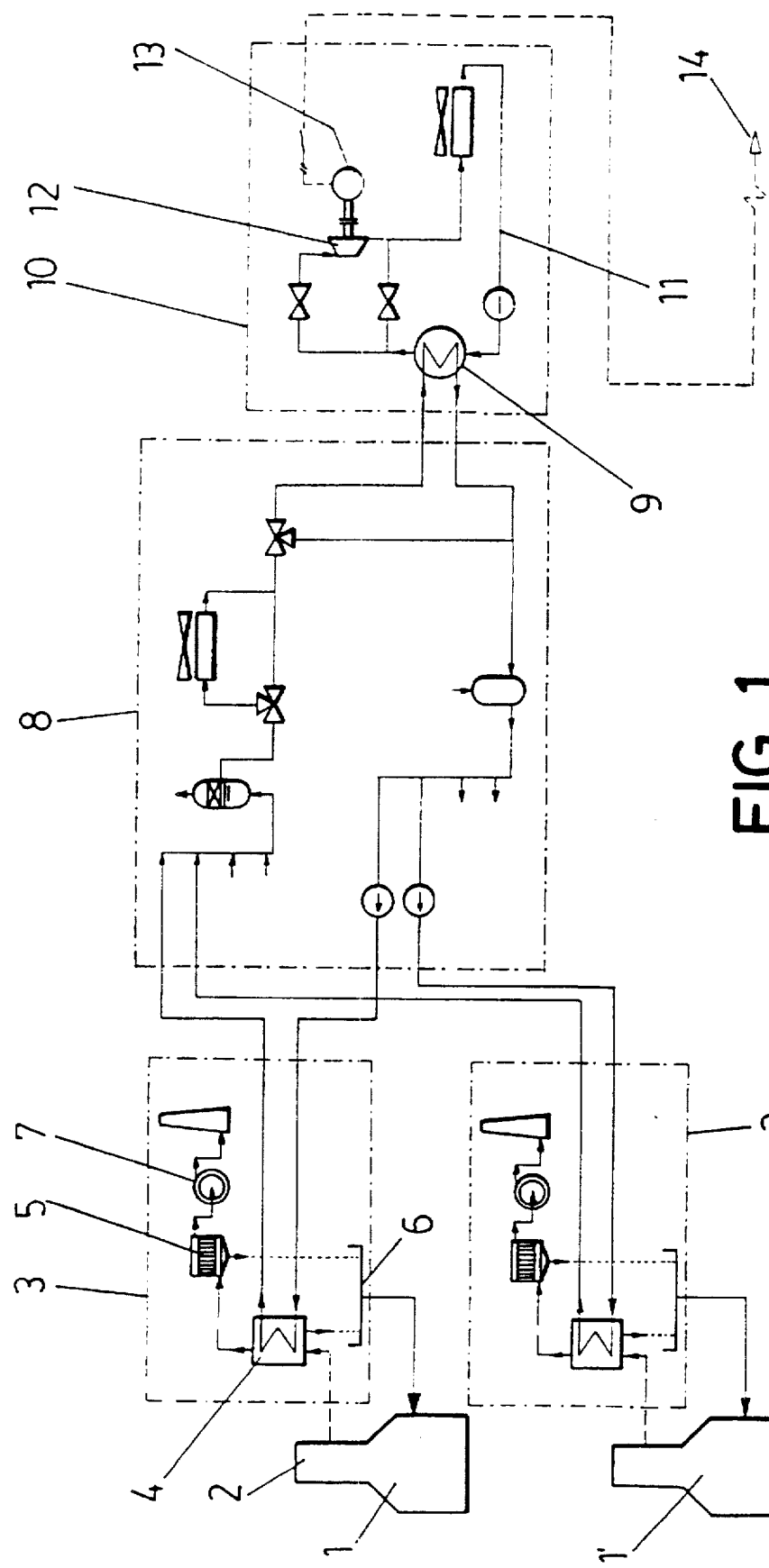
FIG. 1.-Is a diagram showing the fusion heat recovery and combustion gases filtering system, with electric power production, wherein two ovens are used and the fluid used for heat transmission is a liquid such as water or oil.

Bearing in mind that the diagram of FIG. 1 represents a system in accordance with the description given in the related patent of invention U.S. Pat. No. 9,302,634, and that FIG. 2 has been drawn with the improvements subject of the present addition invention, the characteristics of the former should usefully be recalled to see where the improvements actually lie.

In this sense, FIG. 1 shows a variable number of ovens (1–1') and an exhaust passage (2) provided for every oven (1). An operative unit (3) is included, which works with a heat exchanger (4) to cool the gases or fumes down to a suitable temperature in order for the same to be filtered as best as possible in a self-cleaning textile bag or cap filter (5). The gases or fumes are filtered in such a way that the waste products extracted by the filter (5) can reach a manifold (6) from which they can move back into the oven (1) to be recycled, according to the arrow shown in the figure. The filter (5) working with a conventional aspirator (7) that expedites the flow of the gases.

The exchanger (4) is associated with a circuit (8), preferably a water circuit, although oil or any other heat transmission fluid can also be used. The operative units (3) of the various ovens (1) all meet at the water circuit (8). The water circuit is associated with a second output exchanger (9) that transmits heat to a turbogenerator (10). The heat transmitted comes from the water heated in the input exchangers (4) to a temperature ranging between 90 and 150° C. The turbogenerator includes a circuit (11) that has an organic fluid to drive a turbine (12) with which an alternator (13) is associated for the generation of output electric current (14).

Figure 2:
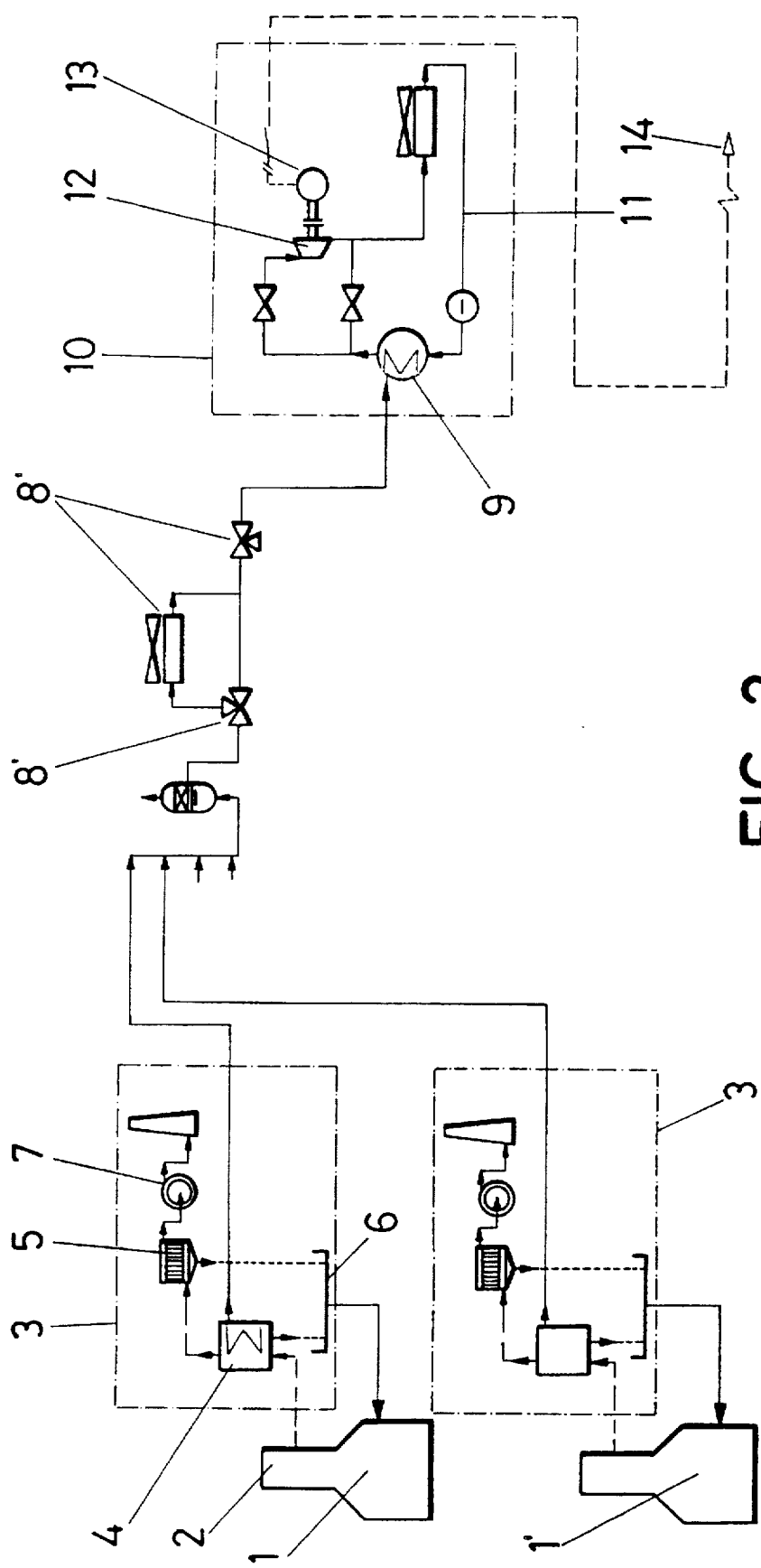
FIG. 2.-Is another diagrammatic representation of the system in accordance with the improvements of the present invention, i.e. using air as the heat transmission fluid, thereby eliminating the return circuit, an enabling the air to be evacuated directly to the atmosphere.

The system in accordance with the improvements, represented in FIG. 2, uses air in lieu of water or oil as the heat transmission fluid. In other words, gases from the ovens (1-1') flow through the exchangers (4), to the filters (5). The filers (5) are associated with the aspirator (7) which expedites the flow of such gases. These which components are included in each operative unit (3) as explained hereinbefore. Furthermore, waste products reach a manifold (6), which enable the waste products to move back into the respective oven, as explained hereinbefore.

Now then, in accordance with the improvements, air will be used as the heat transmission fluid, in which case there is neither a return nor a circuit as identified in FIG. 1 with the reference numeral (8). This means that only components such as valves and other elements (8') are included for gases to flow from the exchangers (4) to the output exchanger (9).

In other words, in accordance with the improvements, air is used as the heat transmission fluid and the temperature to be attained will range between 90 and 400° C. in lieu of between 90 and 150° C. referred to hereinbefore.

As explained before, since air is used as the heat fluid, the closed circuit return from the output exchanger (9) will no longer be required since the air will be discharged directly to the atmosphere.

On the other hand, it is noteworthy that the turbogenerator (10) circuit uses a water vapour fluid, although an organic fluid can also be used, depending in each case on the temperature and characteristics of the heat fluid chosen.

With the system in accordance with the improvements, the powder contained in the exhaust gases from every oven (1) is separated and hence be used in the relevant oven, thereby increasing frit production and drastically reducing the amount of waste powder to be disposed of. Moreover, the plant will be more economical, since one hand, the fluid used does not cost any money. On the other hand the closed cooling circuits can be eliminated and an open circuit used which provides more economical maintenance is achieved since air is used and no waste products will be created in the passages.

Another element that helps reduce the economical cost lies in that the circuit in which the system units (3) all used to meet is eliminated in this case and the fluid passes directly, through the components (8'), to the output exchanger (9).

I claim:

1. A fusion heat recovery and combustion gas filtering system with electrical power production applicable to ceramic plants including several ovens used with various kinds of enamel, the fusion heat recovery and combustion gas filtering system comprising:

an operative filtering unit (3) coupled to each of the ovens, wherein each operative filtering unit (3) includes a heat exchanger (4) for cooling fumes leaving the ovens and a filter (5) for recovering powdered enamel being sent back to the ovens for recycling;

an organic cycle turbogenerator (10) coupled to each of the operative filtering unit (3) including an output exchanger (9) for extracting heat from the fumes and a turbine (12) receiving the heat from the output exchanger (9) for driving an alternator (13) generating the electric power; and an open circuit for direct communication between the heat exchangers (4) and the output exchanger (9) enabling air to be used as a heat transmission fluid;

wherein the turbogenerator (10) is configured to use a vapor fluid.

2. The system of claim 1, wherein the heat exchangers are adapted to operate between 90 and 400° C.

* * * * *